United States Patent
Ludwig et al.

(10) Patent No.: US 7,159,162 B2
(45) Date of Patent: Jan. 2, 2007

(54) SEMI-RELIABLE ARQ METHOD AND DEVICE THEREOF

(75) Inventors: Reiner Ludwig, Huertgenwald (DE); Michael Meyer, Aachen (DE); Joachim Sachs, Aachen (DE); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 150 days.

(21) Appl. No.: 10/504,051

(22) PCT Filed: Jan. 30, 2003

(86) PCT No.: PCT/EP03/00945

§ 371 (c)(1), (2), (4) Date: Aug. 9, 2004

(87) PCT Pub. No.: WO03/069834

PCT Pub. Date: Aug. 21, 2003

(65) Prior Publication Data

US 2005/0201378 A1 Sep. 15, 2005

(30) Foreign Application Priority Data

Feb. 13, 2002 (EP) ................... 02003111

(51) Int. Cl.
*G08C 25/02* (2006.01)
*H04L 1/08* (2006.01)

(52) U.S. Cl. .................... 714/748; 714/749
(58) Field of Classification Search ............ None
See application file for complete search history.

(56) References Cited

U.S. PATENT DOCUMENTS

| 5,793,744 | A | * | 8/1998 | Kanerva et al. | 370/209 |
| 6,052,385 | A | * | 4/2000 | Kanerva et al. | 370/468 |
| 6,519,223 | B1 | * | 2/2003 | Wager et al. | 370/216 |
| 2003/0012201 | A1 | * | 1/2003 | Ahn | 370/394 |

FOREIGN PATENT DOCUMENTS

| WO | WO 0060799 A | 10/2000 |
| WO | WO01/50789 A1 | 12/2000 |
| WO | WO 0115373 A | 3/2001 |

OTHER PUBLICATIONS

European Patent Office, International Search Report for PCT/EP03/00945, dated Jun. 2, 2003.

* cited by examiner

*Primary Examiner*—Phung My Chung (57) ABSTRACT

A method and device for handling received data units at the receiving peer of a predetermined data unit exchange protocol at a given layer is described, where said method and device carry out a limited ARQ mechanism for received data units, and are characterised by providing the possibility of storing corrupted copies of received data units, and providing a data unit to an upward release handler on the basis of one or more stored corrupted copies of a given data unit after a triggering event terminating the operation of the retransmission request procedure for the given data unit.

23 Claims, 5 Drawing Sheets

SEMI-RELIABLE ARQ METHOD AND DEVICE THEREOF

FIELD OF THE INVENTION

The present application generally relates to the field of data unit based communication in a hierarchy of communication protocol layers, and more specifically to a method and device of handling received data units at a receiving peer of a predetermined protocol at a given layer.

BACKGROUND OF THE INVENTION

The concept of data unit based communication in a hierarchy of protocol layers is well known in the art. In such systems data to be sent over a connection is divided into a plurality of data units, which are passed through a hierarchy of protocol layers, where each layer is responsible for a predetermined aspect of the communication. For example, the OSI model describes such a hierarchy of layers. It may be noted that the subdivisions into which an amount of data is divided sometimes receive different names, such as protocol data unit (PDU), service data unit (SDU), packet, frame, cell, segment etc., depending on the specific protocol or technology involved, and for the purpose of the present specification, the term "data unit" shall be used generically to relate to any such subdivision of data.

Figure 2:
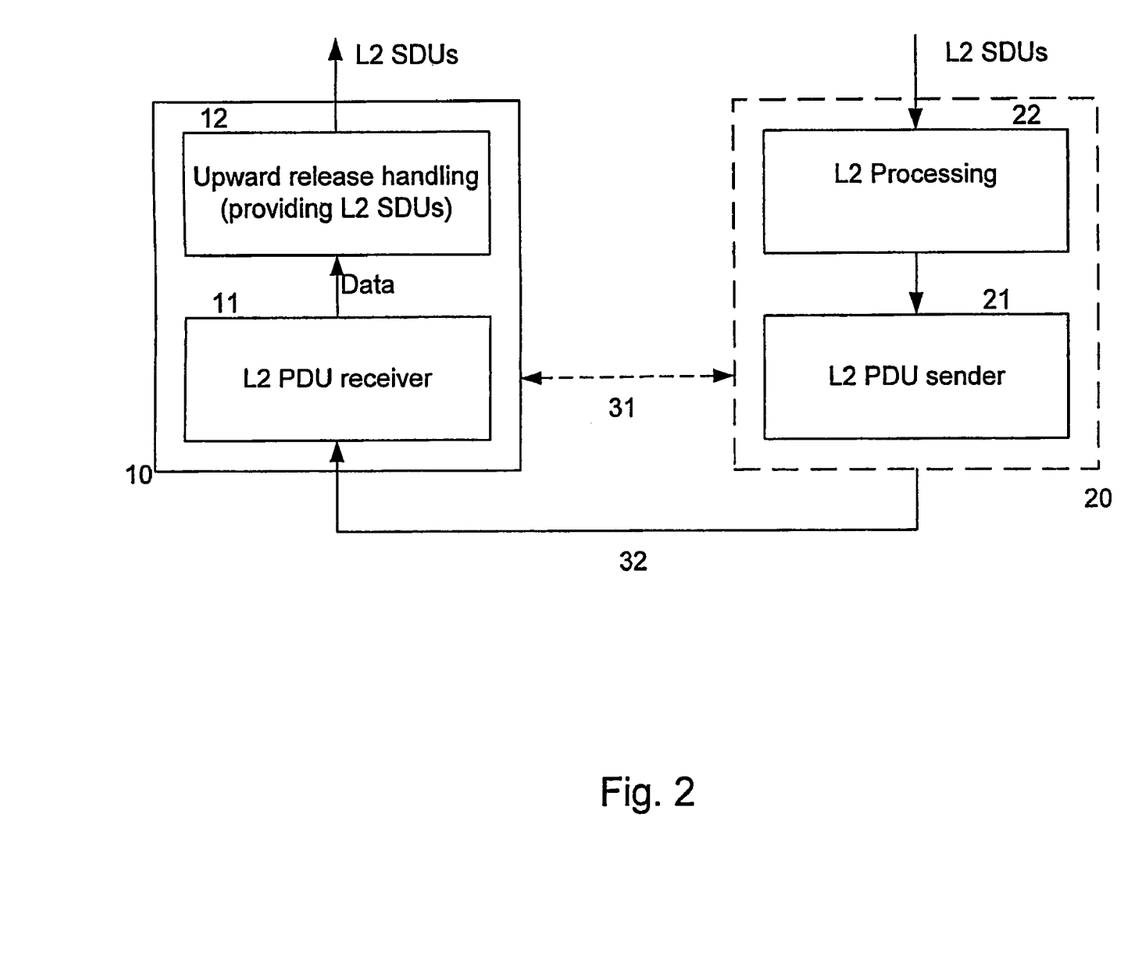
FIG. 2 shows a schematic block diagram for explaining the handling of data units at two peers of a communication protocol at a given layer.

A schematic example of the processing of data at a given layer in a protocol hierarchy will be explained on the basis of FIG. 2. In the example of FIG. 2, processing at a layer 2 (L2) or link layer is shown. The link layer is a layer responsible for transmission over one link from among a possible plurality of links in a communication between two endpoints. In the example of FIG. 2, on the sending side so-called layer 2 (L2) service data units (SDU) are processed into L2 protocol data units (PDU) and sent to a receiver. It may be noted that the term service data unit (SDU) for data units received by a given layer from above (on the sending side) and released by said given layer to above (on the receiving side), and protocol data unit (PDU) for data units transmitted at the given layer shall be used in the present application in order to better distinguish between the respective data units. An L2 SDU can e.g. be an L3 PDU. However, the L2 layer shown in FIG. 2 can also be a sublayer of a larger layer, such that the L2 SDU would then be a data unit of a higher sublayer. An SDU can alternatively be referred to as a higher layer data unit, where the term "layer" is intended to generically refer to entire layers, sublayers, groups of layers or sublayers, or any combination thereof.

FIG. 2 shows a so-called sending peer 20 and a receiving peer 10. A peer can for example be a radio network controller, a base station or a mobile unit in a wireless transmission system. The sending peer 20 receives L2 service data units from the higher layer 3 (e.g. the network layer, which establishes the route between sending and receiving stations, i.e. is responsible for establishing a network of links), and processes these L2 service data units in an entity 22. The specific processing will depend on the specific protocol implemented at L2. For example, it is known to simply encapsulate the higher layer data units, which means to take an L2 SDU and place it into a payload section of an L2 PDU, which besides this payload section also comprises a control information section, such as a header. The processing in entity 22 can also consist in a segmentation of the L2 SDU into a plurality of L2 PDUs, i.e. the data that makes up a L2 SDU is placed into the payload sections of a plurality of L2 PDUs or a concatenation. The concepts of encapsulation, concatenation and segmentation are well known in the art and therefore do not need to be described in more detail. The one or more L2 PDUs are then handled by a sending entity 21 and passed on to lower layers, which are schematically represented by arrow 32. At the receiving peer 10, the L2 PDUs are received by a receiving entity 11 in the receiving peer 10. The receiving peer 10 and the sending peer 20 are connected by a virtual link 31 set up in accordance with the communication protocol at L2. In general, the receiving peer 10 will receive and process the L2 PDUs, in order to finally provide L2 SDUs, which are released upwards to the higher layer L3.

In order to safeguard a reliable data transmission, the L2 PDU receiver 11 may perform an error detection procedure for determining whether a received L2 PDU is corrupted or not. The term "corrupted" will be used to describe any change that occurred in a data unit along its transmission through the lower layers 32, which leads to the copy of a given L2 PDU received at the receiving peer 10 not being identical to the copy sent by the sending peer 20. Such corruption can e.g. consist in the changing of one or more bits in such a data unit due to errors at the physical layer. Then, in response to such error detection, the further handling of such data units can be performed, for example, it is possible that all corrupted L2 PDUs are simply discarded without any other action being taken, or they are discarded and a corresponding indication of corruption is sent back to the sending peer 20, e.g. in the form of an automatic retransmission request (ARQ).

FIG. 2 also shows an upward release handling procedure 12, which is arranged to process the data from received L2 PDUs in order to provide L2 SDUS. For example, if the L2 processing in entity 22 of the sending peer 20 consists in simple encapsulation, then the upward release handling of entity 12 in the receiving peer can consist in simply removing this encapsulation, i.e. isolating the payload section of the L2 PDU in order to provide the L2 SDU contained therein and passing it upward. If the L2 processing in entity 22 is more complicated, e.g. consists in segmentation, then the upward release handling of entity 12 will perform the corresponding inverse operation, e.g. assemble L2 SDUs from the contents of the payload sections of the received L2 PDUs.

It may be noted that although the above described basic procedure was described in connection with processes at the link layer, such a procedure of data handling can also occur at other layers, such as the transport layer, the network layer and the physical layer. It should also be noted, as already mentioned, that the term "layer" throughout this text can relate to implementations of a single layer, groups of layers or sublayers, or any combination of layers and sublayers.

In general, as already mentioned, if the receiving peer determines that the received data unit is corrupted, this data unit will be discarded. The fact that a data unit is corrupted is generally established by examining redundancy information added to a data unit prior to being sent. For example, it is known to add a check sum or CRC (Cyclic Redundancy Checking) code of the bits in a data unit, and the check sum is sent along with the data unit in a control information part, e.g. the header. Then a receiving peer can itself calculate the check sum and compare the calculated check sum with the check sum sent along with the data unit, where a mismatch is an indication of corruption. Other methods to indicate corruption are also known, such as the use of reliability information from the receiver or channel decoder in the physical layer (or generally a lower layer).

In order to avoid that corruption occurs in data units, it is known to apply so-called forward error correction (FEC). Forward error correction implies that the sending side undertakes measures that increase the probability that no corruption occurs during transmission and/or that corruption can be corrected by the receiving peer. FEC is generally known in the art and does not need to be explained in further detail here.

In addition to or in place of FEC, the above-mentioned mechanism of ARQ can be used to guarantee the correct transmission of a data unit. Namely, in an ARQ mechanism a receiving peer will continue to send appropriate automatic retransmission request messages to a sending peer until it has received an uncorrupted data unit. This is also well known in the art and does not need to be explained in more detail here.

As a consequence, in communication networks different modes of link configuration can be provided by a layer to an application, e.g. a so-called acknowledged mode (AM), an unacknowledged mode (UM) and a transparent mode (TM) in link layer (L2) traffic.

For error control, the TM and UM rely solely on FEC, while AM applies a combination of FEC and backward error control by means of error detection and ARQ. The difference between UM and TM is that TM does not add any protocol header. This is only possible in the context of certain protocols, in which the precise format of user data is known, and a typical example is circuit-switched speech transmission in the global system for mobile communication (GSM). Both UM and AM add a protocol header.

Generally, a link layer is configured according to the class of data which needs to be transmitted. For real-time and streaming traffic, the content has only a temporary relevance, and a speech/video data unit arriving too late at the final receiver is simply discarded. Other types of traffic require an exact transmission of data, such as in the case of a file transfer, such that ARQ is used in order to guarantee correct transmission. Such types of traffic are sometimes also referred to as interactive and best-effort traffic.

Generally, with respect to the different types of traffic and the different modes of transmission, the following link configurations are customary. Real-time traffic uses UM or TM, streaming traffic can apply AM, UM or TM, whereas interactive and best-effort traffic use AM. A general problem of UM and TM is that the FEC has to be configured to achieve sufficient (mean) link quality even for bad link conditions. Therefore, if the transmission conditions are fair or good, a link is generally "overprotected", which means that resources are wasted.

As a consequence, a new method has been proposed which e.g. in the context of the WCDMA radio link control (RLC) protocol is referred to as "SDU discard", see e.g. 3 GPP TS 25.322, V4.3.0 (2001, 12). This method applies an AM mode that is reliable only within a limited time interval within which ARQ is applied. In other words, automatic repeat requests for a given data unit are not sent indefinitely when no uncorrupted data unit arrives. Much rather, if no uncorrupted data unit arrives within a predetermined time or after a predetermined number of retransmission requests, the sending of retransmission requests for that given data unit is stopped.

By using such a mechanism, a better balance between FEC and ARQ can be achieved, because the FEC can be tailored to fair or good channel conditions, i.e. to use less resources, and during bad channel conditions additional quality is provided by the semi-reliable or limited ARQ.

Real-time or streaming applications are generally transported without ARQ in the transport protocol, e.g. with the well known user datagram protocol (UDP). As already-mentioned previously, in the transport of real-time or streaming traffic, the link layer will pass uncorrupted data units upwards and will discard corrupted data units, where it is relied upon that the higher layer, e.g. at the application layer, can deal with the missing data. In order to support the error concealment capabilities that are sometimes provided at higher layers, for example the application layer, it has been proposed to introduce a protocol called UDP-light which allows error tolerance with respect to passing corrupted data units upwards if the corruption occurs in a predetermined section of the data units. In other words UDP-light can be implemented to not categorically discard all corrupted data units received, but can allow data units having corruption in the predetermined section to be passed upwards, where it is assumed that the higher layers may have the capability of dealing with the flawed data. In UDP-light the error detection function is controlled such that the sensitivity of the error detecting CRC (cyclically redundancy checking) code is appropriately chosen, such that the link layer does not notice certain bit errors, and the corresponding data is consequently passed upwards to higher layers.

OBJECT OF THE INVENTION

It is the object of the present invention to provide an improved method and device of handling received data units at a receiving peer of a predetermined protocol at a given layer.

SUMMARY OF THE INVENTION

This object is solved by the method of claim 1 and the device of claim 26. Advantageous embodiments are described in the dependent claims.

In accordance with an embodiment of the present invention, an error detection procedure is provided that determines whether a received data unit is corrupted or not, and if it is not corrupted, it is passed to an upward releasing procedure for being processed into a higher layer data unit. Also, a retransmission request procedure is provided for requesting the retransmission of a corrupted data unit. Additionally, a data unit storage procedure is provided for storing corrupted, received data units or information from which said corrupted first layer data unit can be determined. In other words, instead of categorically discarding corrupted data units, they may be stored. The storing can be performed in the same layer or in a lower layer. Furthermore, a data unit providing procedure is implemented, which subsequent to a triggering event for terminating the retransmission request procedure for a given data unit provides a data unit for the upward release handling procedure on the basis of one or more stored corrupted copies of the given data unit. In this way, a semi-reliable or limited AM mode is provided, in which a limited ARQ method is applied, and corrupted data is passed on at the moment that the ARQ mechanism stops operating. In other words, if no uncorrupted copy of a data unit arrives within the limited operation period of the ARQ mechanism, then data is passed upwards on the basis of the one or more corrupted copies of the given data unit.

The present invention is particularly suited for being applied to streaming traffic, in which the delay caused by the limited ARQ is acceptable, and in which certain error concealment capabilities at higher layers can be expected.

Namely, when streaming either audio or video, the receiving application will buffer a certain amount of data before presenting this to an appropriate presentation device (such as a loudspeaker or video screen), such that a certain degree of delay in the transmission can be tolerated.

Preferably, the present invention is applied at the link layer, and more preferably at the link layer of a node in a mobile communication system. There, it can advantageously be used to handle data units sent over a wireless link. For example, the invention can be used in the context of the universal mobile telephone system (UMTS) for handling data units sent over a streaming bearer. However, the invention is also applicable in a plurality of other wireless systems, like GPRS (General Packet Radio Service) or WLAN (Wireless Local Area Network).

Further aspects and advantages of the present invention shall become apparent from the following description of detailed embodiments, which with reference to the appended drawings are intended to provide a better understanding of the invention and to describe advantageous details, but are not intended to be limiting.

DETAILED DESCRIPTION OF EMBODIMENTS

Figure 1:
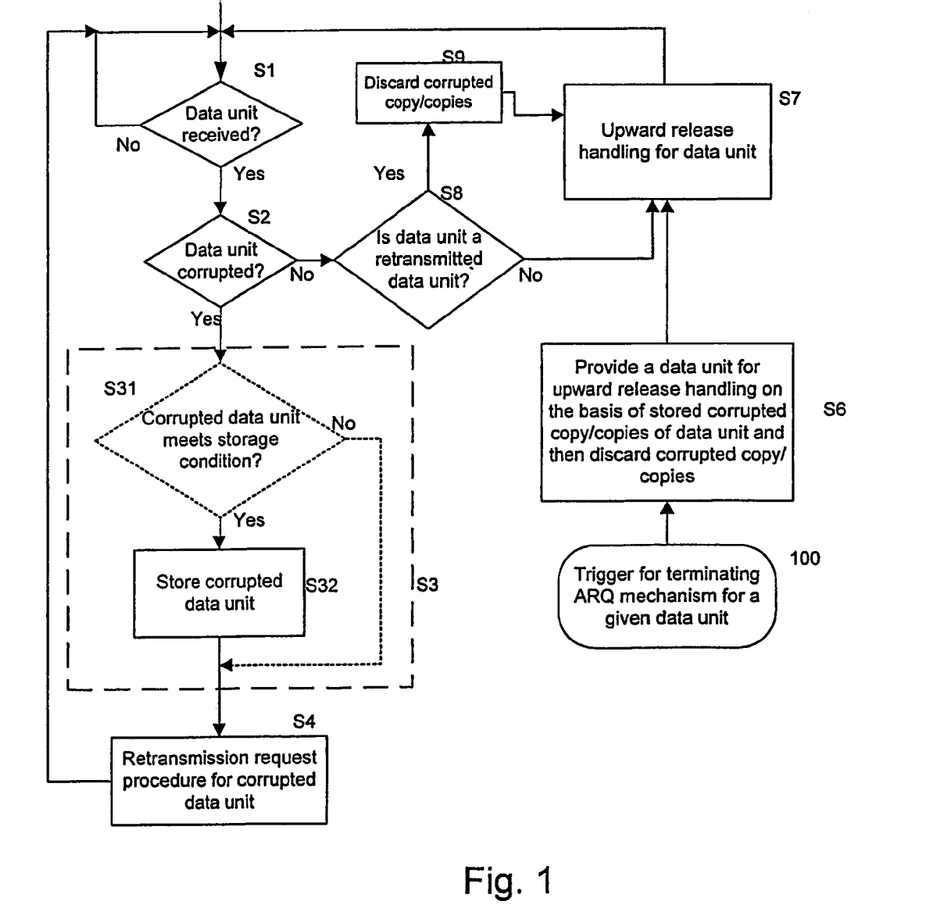
FIG. 1 shows a flow chart of an embodiment of a method according to the present invention.

FIG. 1 shows a flow chart of a method provided in accordance with the present invention. The method described in connection with FIG. 1 can be implemented in the context of the structure shown schematically in FIG. 2. As a consequence, the complete previous description relating to FIG. 2 is herewith incorporated into the disclosure of the embodiment of the present invention.

Although the method of FIG. 1 shall be described in connection with an application to the link layer of a communication node handling data units sent over a given link, the method of the embodiment described in FIG. 1 can be applied to any layer handling data units.

In a first step S1, it is determined whether a L2 PDU has been received. If yes, an error detection procedure S2 determines whether the received L2 PDU is corrupted or not. As already mentioned previously, the term "corrupted" is to be understood generally as relating to any change that occurred in the L2 PDU during transmission, e.g. any difference of one or more bits in the L2 PDU between the received L2 PDU and the sent L2 PDU. The state of corruption can be determined in any known or suitable way, e.g. by a CRC sum method.

If step S2 determines that the data unit is not corrupted, then the flow branches to a procedure according to which the received uncorrupted data unit is passed to an upward release handling procedure S7 that handles the release of data from the receiving peer (e.g. the receiving peer 10 of FIG. 2) to an above lying higher layer e.g. L3 in the example of FIG. 2. As already mentioned previously the specific details of the upward release handling procedure will depend on the specific protocols involved, and can e.g. consist in the simple removal of encapsulation from L2 PDUS, or can also involve more complicated steps, such as the assembly of L2 SDUs from segmented L2 PDUs.

On the other hand, if the determination of the error detection procedure S2 is such that the received L2 PDU is corrupted, then the flow branches to a data unit storage procedure S3 and a retransmission request transmission procedure S4. It may be noted that although the example of FIG. 1 shows that the data unit storage procedure S3 is conducted before the retransmission request procedure S4, this is not necessary, as the order could also be reversed or the retransmission request procedure S4 and the data unit storage procedure S3 could also be conducted in parallel.

The data unit storage procedure S3 serves to store corrupted copies of received L2 PDUs. The retransmission request procedure S4 serves to request the retransmission of a received corrupted data unit. The precise details of the retransmission request procedure depend on the details of the given application and protocols involved, and may generally involve sending a predetermined message to the sending peer 20 (see FIG. 2), such that the sending peer will retransmit the specific L2 PDU of which a corrupted copy was received at the receiving peer 10. The concept of retransmission request messages and corresponding signalling is well known in the art, such that a further description is not necessary here.

After the procedures S3 and S4 for storing a corrupted data unit and conducting a retransmission request procedure, the flow branches back to waiting for further data units to arrive. In this way, if the retransmission request procedure leads to one or more additional corrupted copies of the given data unit arriving, then these will again lead to the performing of the data unit storage procedure S3 and the retransmission request procedure S4.

In the example of FIG. 1, if step S2 determines that a received L2 PDU is not corrupted, then step S8 is performed in which it is determined whether the uncorrupted data unit is a retransmitted data unit. If not, the received uncorrupted data unit is passed to the upward released handling procedure S7, and if it is a retransmitted data unit, then the flow branches to step S9, in which the corrupted copy or copies stored are discarded as they are no longer of use. Then the received uncorrupted data unit is also passed to the upward release handling procedure S7. Naturally, the passing of the uncorrupted copy to the procedure S7 and the discarding of corrupted copies could be conducted in reverse order or in parallel.

The determination whether a received uncorrupted data unit is a retransmission or not in step S8 can be conducted in any suitable or desirable way. For example, if the protocol uses a retransmission indicator or flag in the data units (e.g. a single bit, which indicates either first transmission or retransmission), then the determination of step S8 is straight forwardly conducted by examining the appropriate indication. Alternatively, step S8 can consist in examining a record of the corrupted copies of data units stored by the data unit storage procedure S3, such that step S8 determines whether a copy of the received uncorrupted data unit is in memory or not. If there is a corrupted copy; then procedure S8 branches to step S9, and otherwise passes the received uncorrupted data unit directly to the upward release handling procedure S7.

The identification of individual L2 PDUs and corresponding copies can be done in any suitable or desirable way, e.g. with the help of sequence indicators in the control information part (e.g. header) that indicate the position of a respective L2 PDU in the overall sequence of L2 PDUs being sent.

It may be noted that steps S8 and S9 are only optional, and that other mechanisms can be implemented for ensuring that stored corrupted copies of received data units are purged when they are no longer of any use. For example, such a purging of the memory or buffer in which these corrupted copies of data units are stored can be conducted periodically, where the period is set sufficiently long with respect to the requirements of the system.

In accordance with the present invention, the ARQ mechanism implemented with the help of the retransmission request procedure is not conducted indefinitely. Namely, the repeated sending of retransmission requests for a given data unit is only conducted until a triggering event for terminating the ARQ mechanism occurs, as indicated by reference numeral 100 in FIG. 1. Numerous possibilities exist for choosing a triggering event, as shall be explained in more detail further on.

In the present invention, in response to the triggering event for terminating the ARQ mechanism, a data unit providing procedure S6 is initiated, which provides a data unit to the upward release handling procedure S7 on the basis of the one or more stored corrupted copy of the given data unit for which the ARQ mechanism was terminated. Numerous possibilities exist for providing one or more data units for upward release handling on the basis of stored corrupted copies, as shall be explained in more detail further on.

Preferably, after the one or more data units have been provided to the upward release handling procedure S7, the data unit providing procedure S6 discards or purges all corrupted copies of the data unit for which the ARQ mechanism has been terminated. However, this is only an option, and as already explained before with respect to steps S8 and S9, such a purging of stored corrupted copies can also be done periodically.

As can be seen from the example of FIG. 1, the present invention combines a limited or semi-reliable ARQ mechanism with the possibility of passing corrupted data units upwards to a higher layer. More specifically, when the ARQ for a given data unit stops operating, the receiving protocol entity delivers the corrupted data to the higher protocol layer. When e.g. applied to a link layer, this concept allows to combine a resource efficient acknowledged mode configuration for e.g. a streaming transmission with a support of error concealment at higher layers by at the same time allowing the higher application layer to handle corrupted data by itself. This simultaneously allows resource efficient link management and advanced application control.

As already mentioned above, the providing of a data unit on the basis of stored corrupted copies of a given data unit can be conducted in any suitable or desirable way. Preferably, the data unit providing procedure S6 is arranged to comprise a routine for combining multiple corrupted copies of a given data unit, in order to provide a combined copy of the L2 PDU of which corrupted copies were stored. It may be noted that the data unit storage procedure S3 and/or the upward-release handling procedure S7 could additionally and/or alternatively comprise such a routine for combining multiple corrupted copies. Either a hard combining of the L2 PDU copies or a soft combining of the copies stored on the physical layer can be performed. The combining may comprise the synthesising of a new copy of the given L2 PDU from corrupted copies thereof. Such a synthesising can e.g. comprise the localising of an error in each corrupted copy, and then extracting the respective uncorrupted parts from each overall corrupted copy, in order to construct a synthesised copy that contains as little corruption as possible, preferably none at all.

Alternatively or in addition to the synthesising, the routine for combining may also comprise the selecting of a copy from among the corrupted copies of a given data unit. Namely, if a plurality of corrupted data units is present, then the routine may determine the degree of corruption of each stored copy and select the copy with the lowest degree of corruption.

As already mentioned the routine for combining multiple corrupted copies can also be implemented in connection with the data storage procedure S3, such that e.g. only a combined data unit is stored. Namely, the data storage procedure can be implemented in such a way that when a first corrupted copy of a given data unit is received, it is simply stored. Whenever further corrupted copies are received, they can be combined with the previously stored copy in accordance with one of the above mentioned concepts, such that the outcome is always one stored copy.

Alternatively, it is also possible that the combining procedure is conducted at the upward release handling procedure S7, such that the data storage procedure S3 simply stores all corrupted copies, and subsequent to the triggering event, the data unit providing procedure S6 simply provides all stored corrupted copies to the upward release handling procedure S7, which in turn performs a combining procedure, in order to generate one copy that is used in the process of preparing an upper layer data unit (e.g. L2 SDU) for upward release.

According to a further preferred embodiment, the data storage procedure S3 comprises a routine for discriminating L2 PDUs into at least a first and a second category, where corrupted copies of the first category are stored and corrupted copies of the second category are discarded. This is shown by the optional step S31 in FIG. 1. In other words, only if the received corrupted data unit meets a predetermined storage condition, will it actually be stored in a following step S32. Otherwise, the corrupted data unit is not stored. The predetermined storage condition can be chosen in any suitable or desirable way, and can e.g. be based on identifying a predetermined section of a corrupted data unit under consideration, determining whether the predetermined section is corrupted and then discriminating the data unit into the category for discarding if the predetermined section is corrupted. Preferably, the predetermined section is the control information part or header of the data unit, such that L2 PDUs with a corrupted header are not stored in the data storage procedure S3, whereas data units in which only the payload section is corrupted are stored.

In more general terms, a sensitive part of a received data unit is defined and accordingly a non-sensitive part. If corruption occurs in the sensitive part, then the data unit is not stored, whereas if corruption occurs only in the non-sensitive part, then the data unit may be stored.

In another embodiment of the routine S32 for discriminating corrupted copies of received data units into at least two categories, this routine may comprise the obtaining of reliability information on the corrupted copy of the data unit, determining from the reliability information a probability that a predetermined section of the corrupted data unit is corrupted, comparing the probability with a determined threshold, and then discriminating the corrupted copy into the category for discarding if the probability exceeds the predetermined threshold.

Again, the predetermined section is a sensitive part, which is preferably a control information part, such as the header.

The advantage of providing a routine for discriminating between corrupted data units to be stored and corrupted data units to be discarded in the data unit storing procedure S3 is that it may not be worthwhile to store corrupted copies that will probably lead to problems in the overall transmission if passed upwards. Namely, bit errors in the payload are generally tolerable, but bit errors in the control information part (e.g. header) can result in a malfunctioning of the protocol at the receiving peer.

Figure 3:
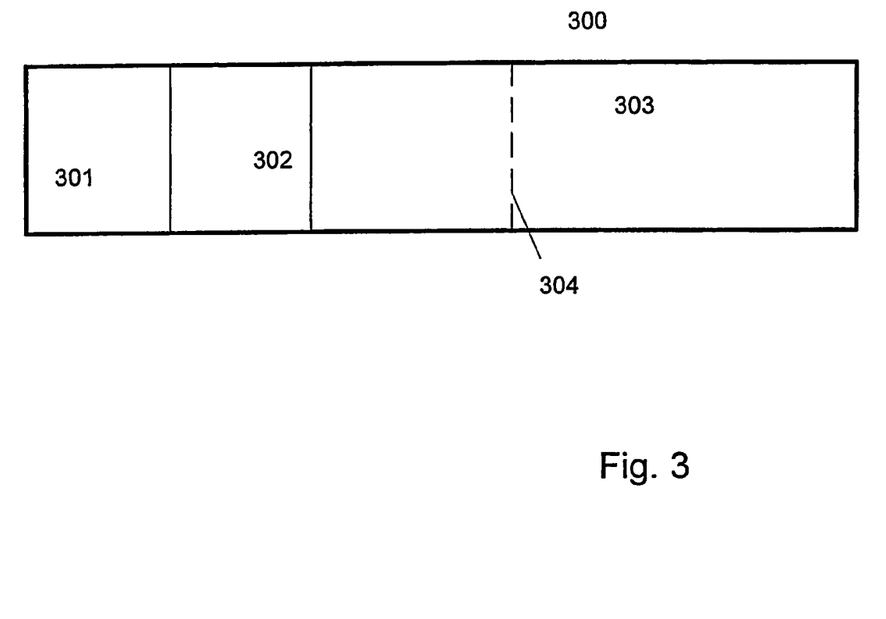
FIG. 3 shows a schematic example of a data unit.

Generally, the sensitive part of a L2 PDU can be defined in any suitable or desirable way. An example of an L2 PDU is shown in FIG. 3. Namely, the L2 PDU 300 comprises a header part 301, 302 and a payload section 303. The payload section will contain parts of one or more L2 SDUs, where the dashed line 304 indicates a transition between two L2 SDUs, which shall be explained in more detail further on.

Taking the radio link control (RLC) protocol according to 3 GPP TS 25.322, V4.3.0 (2001, 12) as an example, two parts of a RLC header can be defined, namely the first part 301 having a fixed length, which for example includes the sequence numbers that identify the position of a given L2 PDU in the sequence of PDUs, and a second part 302 that depends on the payload and is therefore variable in size. This latter part is used for framing of SDUs, by indicating where the payload of a SDU (or padding bits) starts and ends. This part can be of variable length, depending on how many transitions of SDUs exist. Namely, the dashed line 304 represents such a SDU transition in the payload of the L2 PDU 300. Typically, the size of the variable part 302 of the header reduces to a set of values which depends e.g. on the size of the PDU 300, the type of service transported, whether the L3 header uses compression (e.g. for IP) etc. Therefore the size of the sensitive part of the RLC PDU can be determined by the fixed size part 301 plus a maximum size of the variable size part 302, which is not exceeded, or not exceeded by a certain probability.

In order to determine whether a bit error has occurred in the sensitive part of a L2 PDU, an additional or separate check sum can be used for the sensitive part, which is separately checked. If the CRC check over the sensitive part of the PDU fails, it should be discarded. However, if bit errors are detected overall but not in the CRC check of the sensitive part, the PDU can be stored.

As already mentioned, it is also possible to obtain reliability information from a channel decoder and/or signal decoder in a receiver module. This information can indicate which parts of the PDU are more likely to contain bit errors than others. If bit errors detected in the PDU and the reliability information reveals (e.g. by comparing to some threshold) that the errors are likely to have corrupted the sensitive part of the PDU, the PDU can be discarded, otherwise it can be processed as described above, namely by being stored.

As already mentioned above, the introduction of an additional procedure S31 for discriminating the corrupted copies to be stored and corrupted copies to be discarded is optional. Namely, it is possible to simply store all corrupted copies. However, even if all corrupted copies are stored, it is still possible to increase the probability that sensitive parts of such stored corrupted copies are not themselves corrupted, namely by applying unequal error protection to the sensitive and non-sensitive parts of the L2 PDUs. For example, the sensitive part can be separately (or additionally) channel coded with a more robust code. Then, if bit errors occur in the PDU (i.e. the PDU is corrupted), the probability that the bit error has occurred in the sensitive part of the PDU is greatly reduced.

As already mentioned, the triggering event 100 for terminating the ARQ mechanism for a given L2 PDU can be chosen as is suitable or desirable. For example, the triggering event can be the receipt of a message from the sending peer, which identifies one or more L2 PDUs for which the ARQ mechanism is to be terminated. An example of such a message is the so-called Move Receiver Window (MRW) message known in connection with SDU discard in the RLC protocol according to 3 GPP TS 25.322. Additionally or alternatively, the triggering event can be the expiry of a timer in the receiving peer. In other words, a timer can be set, which is started when a corrupted copy of a given L2 PDU is received for the first time, and when the timer expires, the data unit providing procedure S6 is triggered. Furthermore, alternatively or additionally, the triggering event can be the sending of a predetermined number of retransmission requests for a given L2 PDU. In other words, the control entity of the receiving peer counts the number of retransmission requests sent for each L2 PDU, and if this number of retransmission requests exceeds a predetermined threshold, the ARQ mechanism for the associated L2 PDU is terminated and the data unit providing procedure S6 is triggered.

As already mentioned, the upward release handling procedure can be arranged as is suitable or desirable in the context of the given layer and the implemented protocols. For example, when the protocol to which the present invention is applied provides for encapsulation of higher layer (L3) data unit into data units of the layer at which the invention is applied (L2 PDUs), the upward release handling procedure S7 may comprise a routine for simply removing the encapsulation from the data units received from the error detection procedure S2 or from the data unit providing procedure S6.

Furthermore, if the protocol implementation to which the present invention is applied provides for the segmentation of higher layer data units (L2 SDUs) into lower layer data units (L2 PDUs), then the upward release handling procedure S7 comprises a routine for assembling the higher layer SDUs from the contents of L2 PDUs received from the error detection procedure S2 or the data unit providing procedure S6. In other words, the upward release handling procedure provides for the removal of the L2 encapsulation and for the assembly of the respective payloads into L2 SDUs.

Figure 4A:
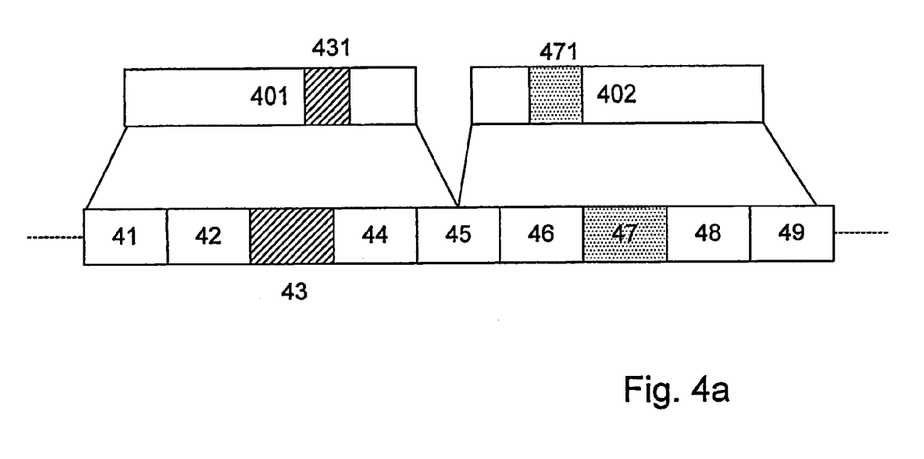
FIGS. 4a and 4b are schematic representations for explaining embodiments that assemble higher layer data units from the contents of received data units.

This is schematically shown in FIG. 4a. There the contents (payload) of L2 PDUs 41 to 49 is assembled into L2 SDUs 401 and 402. As can be seen, L2 PDU 45 comprises a transition, such that it is carries parts of both SDUs 401 and 402.

When the release handling of SDUs is triggered, SDUs are reassembled and delivered to the higher layer. If all PDUs that contain payload belonging to a SDU have been received correctly (i.e. are uncorrupted) this is the standard L2 protocol operation well known from the prior art. If corrupted PDUs containing bit errors exist, an SDU is assembled or reconstructed from the PDU payload containing the bit errors. This is e.g. shown with respect to L2 PDU 47 in FIG. 4a, where the dotted hatching represents a defective PDU. Consequently, the assembled SDU 402 also contains a section that is corrupted, marked as 471.

In the event that at the moment of triggering the termination of the ARQ mechanism (100 in FIG. 1) no stored corrupted copies of the given L2 PDU for which the ARQ mechanism is being terminated are available, several possibilities for responding exist. First of all, it is possible that the data unit providing procedure S6 simply remains silent, and that the upward release handling procedure S7 is implemented to receive triggering event 100 or monitor the time for assembling a given SDU. If the time for assembling a given SDU exceeds a predetermined limit, then the upward release handling procedure S7 can treat any payload from a missing L2 PDU as finally missing, i.e. as no longer forthcoming. However, according to a preferred embodiment, the data unit providing procedure S6 comprises a routine for providing an explicit missing data unit indication to the upward release handling procedure, if subsequent to the triggering event for terminating the ARQ mechanism, no corrupted copy of the given data unit for which the ARQ is being terminated, is in storage. Thereby, the upward release handling procedure S7 is directly informed that the corresponding section of the SDU will not be coming.

The hatching of L2 PDU 43 in FIG. 4a represents a missing L2 PDU, and this leads to an associated missing payload section 431 for the assembly of SDU 401.

In response to determining that a certain section of an SDU under construction is missing, the upward release handling procedure S7 can react in a number of ways. According to one possibility, the upward release handling procedure can discard all L2 SDUs being assembled from the contents of a missing L2 PDU. In other words, in the example of FIG. 4a, the upward release handling procedure S7 would simply discard the remaining parts of what is shown as SDU 401, i.e. would not deliver this data upward. In this connection it may be noted that the upward release handling procedure might not be able to straight forwardly determine whether the missing L2 PDU 43 contained a transition (such as 304 in FIG. 3) between two different SDUs in its payload. Therefore, discarding all of the remaining data shown as 401 in FIG. 4a could mean that in fact two or more SDUs are being discarded.

As an alternative to discarding L2 SDUs in which sections are missing, the upward release handling procedure could also use dummy data in place of the contents of the missing L2 PDU. In one embodiment this can be done by assuming that the missing L2 PDU did not contain any SDU transition, such that simply bits are filled up to fill the gap between the payload of PDU 42 and 44, e.g. by filling in an appropriate number of 0 s or 1 s in order to construct a dummy section 431 that fits into the gap. It is then up to the higher protocol layers to check the integrity of the SDU, e.g. by CRC checking or by comparing the SDU size for the length field(s) in higher protocol layers.

Preferably, the upward release handling procedure has a transition determination routine for the determining whether the missing L2 PDU contains a transition between two L2 SDUs, and wherein dummy data is selected in accordance with the outcome of the determination routine. In other words, the transition determination routine determines if and where a transition in the missing L2 PDU occurred and generates an appropriate number of dummy bits to fill the respective two SDUs, namely one SDU which ends in the missing L2 PDU and one SDU which begins in the missing L2 PDU. Preferably, only the SDU ending in the missing L2 PDU is reconstructed using an appropriate number of dummy bits, as the dummy bits will usually not be suitable for replacing the header of the new SDU beginning in the missing L2 PDU.

Figure 4B:
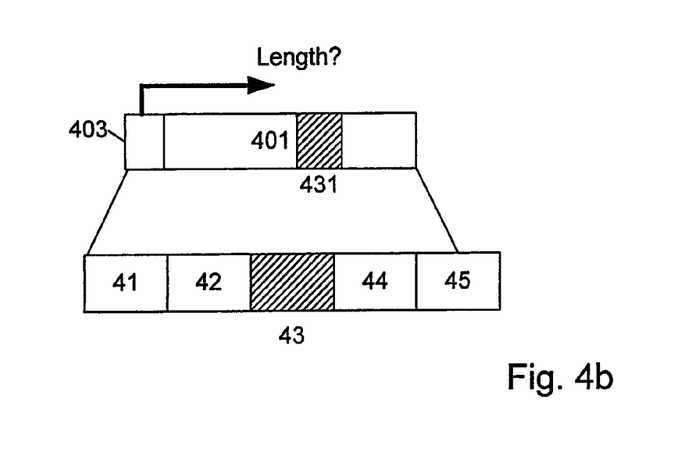

The transition determination routine can be provided in any desirable or suitable way for the specific protocols being used. For example if an L2 SDU or a data unit of a higher layer has a control information part (such as a header) comprising information on the length of said L2 SDU, then the transition determination routine can comprise obtaining or parsing this length of the L2 SDU being assembled, and determining whether the missing L2 PDU contains a transition on the basis of the determined length. This is shown schematically in FIG. 4b. Namely, the transition determination routine parses the control information part 403 of the SDU under assembly, or the corresponding data unit of the higher layer, and if the determined length indicates that this SDU 401 ends within the section 431 that corresponds to L2 PDU 43, then an appropriate number of dummy bits can be generated and inserted. On the other hand, if the determined length indicates that there is no transition in 43, then the construction or assembly of SDU 401 continues with the payload from following L2 PDU 44 and 45, until an explicit transition is defined in the control information of the L2 PDU as e.g. shown with respect to L2 PDU 45.

As can be seen from the above, in the method of the present invention higher layer SDUs can be assembled or constructed from corrupted data and released upwards. Generally, the examination of SDU integrity is thereby left to the higher layers.

Preferably, the upward release handling procedure S7 comprises a further routine for discriminating between L2 SDUs to be released upwards and L2 SDUs to be discarded. In other words, it is preferred that the upward release handling procedure conducts a type of plausibility check at layer 2, in order to avoid forwarding unrecoverable SDUs along the further transmission path.

Preferably, when the upward release handling procedure S7 involves the assembling of segmented data into L2 SDUs, the discrimination is performed on the basis of the location of data from corrupted L2 PDUs in an L2 SDU being discriminated. For example, if the data from a corrupted L2 PDU is contained in the control information part of the SDU being assembled, then this SDU can be discriminated into the category for being discarded, whereas if the data from the corrupted L2 PDU is contained in the payload section of the L2 SDU, then the L2 SDU can be classified into the category for upward release.

Figure 5:
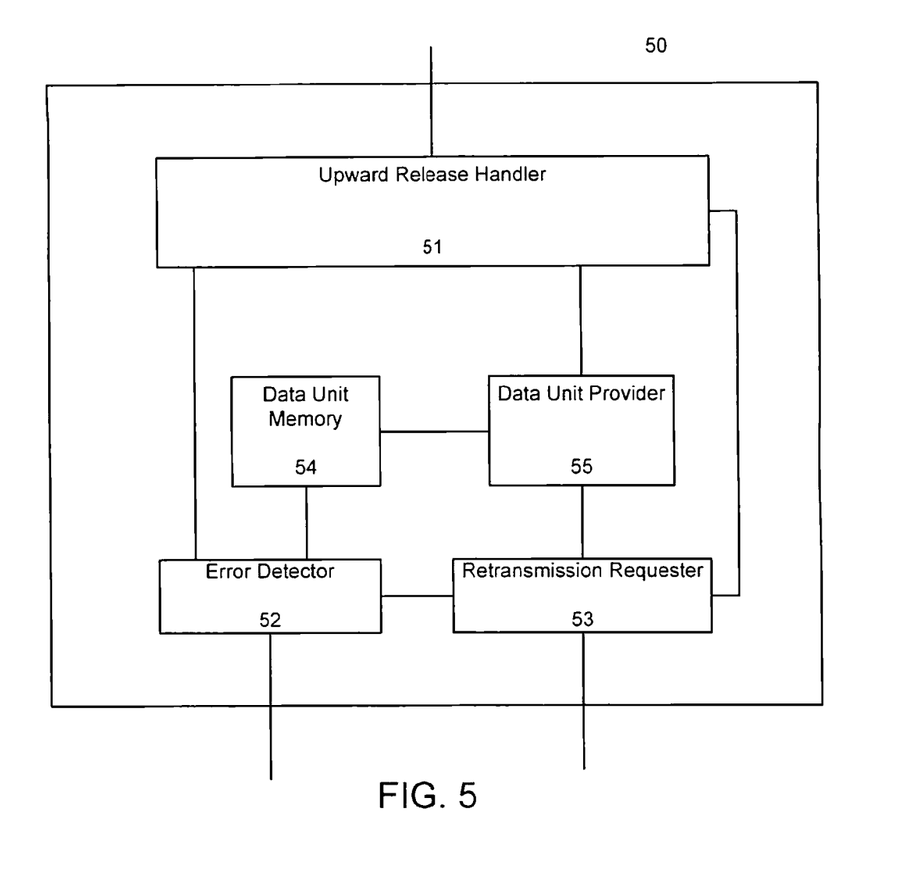
FIG. 5 shows a schematic block diagram of an embodiment of a device according to the present invention.

FIG. 5 shows a schematic block diagram of a device for handling received data units at a receiving peer of a protocol implementation at a given layer. Reference numeral 50 represents a communication device handling data units of a given protocol, e.g. represents a communication node in a network that handles link layer data units. Reference numeral 51 represents an upward release handler for handling a release of data to higher layers, reference numeral 52 represents an error detector for determining whether a received L2 PDU is corrupted or not, and for passing a received L2 PDU to the upward release handler 51 if the L2 PDU is determined as not being corrupted, reference numeral 53 represents a retransmission requester for requesting the retransmission of a received L2 PDU if the error detector 52 determines that the received L2 PDU is corrupted. Reference numeral 54 refers to a data unit memory for storing corrupted L2 PDUs, and reference numeral 55 relates to a data unit provider for providing an L2 PDU to the upward release handler 51 on the basis of one or more stored corrupted copies of a given L2 PDU, where the data unit provider 55 is arranged to operate subsequent to a triggering event for terminating the operation of the retransmission requester for a given L2 PDU.

In other words, the upward release handler 51 implements the upward release handling procedure S7, the error detector 52 implements the error detection procedure S2, the retransmission requester implements the retransmission request procedure S4, the data unit memory 54 is provided for implementing the data unit storage procedure S3, and the data unit provider 55 implements the data unit providing procedure S6. Accordingly, all of the above described preferred embodiments of the indicated procedures and routines can be implemented with respect to the above described elements 51 to 55.

The elements shown in FIG. 5 are schematic representations and can be provided in the form of hardware, of software running on general purpose processors or application specific processors, or a suitable combination of hardware and software.

In this way the present invention can also be embodied in the form of a computer program product, or a computer program which when loaded and executed on a device for handling first layer data units performs one of the above described methods. Furthermore, the present invention can also be embodied as a data carrier carrying such a computer program.

Although the present invention has been described in the context of detailed and preferred embodiments, these embodiments are not to be understood as limiting the invention, which is defined by the appended claims.

Reference signs in the claims serve the purpose of better understanding and do not restrict the scope.

The invention claimed is:

1. A method of handling received data units at a receiving peer of a predetermined data unit exchange protocol at a first layer comprising:
    determining whether a received first layer data unit is corrupted or not,
    passing a received first layer data unit to a second layer higher than said first layer if said received first layer data unit is determined as not being corrupted,
    requesting a retransmission of the received first layer data unit if said error detection procedure determines that said received first layer data unit is corrupted,
    storing copies of said corrupted first layer data unit or data unit content information from which said corrupted first layer data unit can be determined, and
    providing said first layer data unit to an upward release handler on the basis of the stored corrupted copies of the said first layer data unit, subsequent to a triggering event for terminating an automatic retransmission request mechanism for said first layer data unit.

2. The method according to claim 1, wherein said first layer comprises a link layer or a sublayer of a link layer.

3. The method according to claim 1, further comprising combining multiple stored corrupted first layer data unit copies in order to provide a combined copy of said given first layer data unit.

4. The method according to claim 3, further comprising synthesizing a new copy of said first layer data unit from the corrupted copies of said first layer data unit.

5. The method according to claim 3, further comprising selecting a copy from among said corrupted copies.

6. The method according to claim 5, further comprising discriminating corrupted first layer data unit
    into at least a first and a second category, where corrupted first layer data unit of said first category or said data unit content information from which said corrupted first layer data unit can be determined are stored and corrupted first layer data unit of said second category are discarded.

7. The method according to claim 6, further comprising identifying a predetermined section of a corrupted first layer data unit,
    determining whether said predetermined section is corrupted, and
    discriminating a corrupted first layer data unit into said second category if said predetermined section is corrupted.

8. The method according to claim 7, wherein said first layer data unit comprise a control information part and a payload part, and wherein said predetermined section comprises at least a part of said control information part.

9. The method according to claim 6, further comprising obtaining reliability information on a corrupted first layer data unit,
    determining from said reliability information a probability that said predetermined section of the corrupted first layer data unit is corrupted,
    comparing said probability with a predetermined threshold, and
    discriminating said corrupted first layer data unit into said second category if said probability exceeds said predetermined threshold.

10. The method according to claim 9, wherein said reliability information is a check sum over the predetermined section.

11. The method according to claim 1, wherein said triggering event is the receipt of a message from the sending peer of said predetermined data unit exchange protocol sending said first layer data unit.

12. The method according to claim 1, wherein said triggering event is the expiry of a timer in said receiving peer or the sending of a predetermined number of retransmission requests.

13. The method according to claim 12 further comprising:
    providing for encapsulation of a second layer data unit into said first layer data unit, and
    removing the encapsulation from received first layer data unit.

14. The method according to claim 1 further comprising:
    and assembling or segmenting said second layer data unit from the contents of said first layer data unit.

15. The method according to claim 14, further comprising providing a missing data unit indication if, subsequent to said triggering event, no corrupted copy of a data unit corresponding to the missing data unit indication is in storage.

16. The method according to claim 15, wherein said second layer data unit being assembled from the contents of the missing first layer data unit is discarded subsequent to said triggering event.

17. The method according to claim 16, further comprising using dummy data in place of the contents of the missing first layer data unit.

18. The method according to claim 17
    determining whether said missing first layer data unit contains a transition between two second layer data units, and wherein the processing or releasing of said two second layer data units is performed in accordance with the outcome of said determination routine.

19. The method according to claim 18, further comprising determining that at least one second layer data unit or a data unit of a further layer has a control information part comprising information on the length of the at least one second layer data unit
    obtaining the length of said second layer data unit being assembled and
    determining whether the missing first layer data unit contains a transition on the basis of said length.

20. The method according to claim 1, further comprising discriminating between a second layer data unit to be released upward and a second layer data unit to be discarded.

21. The method according to claim 20, wherein said discriminating is performed on the basis of a location of data from said corrupted first layer data unit in said second layer data unit being discriminated.

22. A computer program product for handling received data units at a receiving peer of a predetermined data unit exchange protocol at a first layer comprising:
determining whether a received first layer data unit is corrupted or not,
passing a received first layer data unit to a second layer higher than said first layer if said received first layer data unit is determined as not being corrupted,
requesting a retransmission of the received first layer data unit if said error detection procedure determines that said received first layer data unit is corrupted,
storing copies of said received first layer data unit or data unit content information from which said corrupted first layer data unit can be determined, and
providing said first layer data unit to an upward release handler on the basis of the stored corrupted copies of said first layer data unit, subsequent to a triggering event for terminating an automatic retransmission request mechanism for said given first layer data unit.

23. A device for handling received data units at a receiving peer of a predetermined data unit exchange protocol at a first layer, comprising:
an upward release handler for handling a release of data from said receiving peer to a second layer higher than said first layer,
an error detector for determining whether a received first layer data unit is corrupted or not, and passing a received first layer data unit to said upward release handler if said received first layer data unit is determined as not being corrupted,
a retransmission requester for requesting a retransmission of a received first layer data unit if said error detector determines that said received first layer data unit is corrupted, a data unit memory for storing copies of said first layer data unit or data unit content information from which said corrupted first layer data unit can be determined,
a data unit provider for providing said first layer data unit to said upward release handler on the basis of one or more stored corrupted copies of said first layer data unit, said data unit provider being arranged to operate subsequent to a triggering event for terminating an automatic retransmission request mechanism for said first layer data unit.

* * * * *

UNITED STATES PATENT AND TRADEMARK OFFICE
CERTIFICATE OF CORRECTION

PATENT NO. : 7,159,162 B2
APPLICATION NO. : 10/504051
DATED : January 2, 2007
INVENTOR(S) : Ludwig et al.

It is certified that error appears in the above-identified patent and that said Letters Patent is hereby corrected as shown below:

In Column 2, Line 33, delete "SDUS" and insert -- SDUs --, therefor.

In Column 6, Line 3, delete "PDUS" and insert -- PDUs --, therefor.

In Column 6, Line 61, delete ";" and insert -- , --, therefor.

In Column 14, Line 36, in Claim 14, delete "and" before "assembling".

In Column 14, Line 53, in Claim 18, after "and" delete "wherein the".

Signed and Sealed this

Twentieth Day of May, 2008

JON W. DUDAS
*Director of the United States Patent and Trademark Office*